(12) United States Patent
Cohu

(10) Patent No.: US 7,172,793 B2
(45) Date of Patent: Feb. 6, 2007

(54) METHOD FOR COATING A MOVING WEB AND ARTICLES MADE THEREBY

(75) Inventor: Olivier Cohu, Marly (CH)

(73) Assignee: ILFORD Imaging Switzerland GmbH (CH)

( * ) Notice: Subject to any disclaimer, the term of this patent is extended or adjusted under 35 U.S.C. 154(b) by 286 days.

(21) Appl. No.: 10/611,752

(22) Filed: Jul. 1, 2003

(65) Prior Publication Data

US 2004/0052953 A1    Mar. 18, 2004

(30) Foreign Application Priority Data

Jul. 1, 2002    (EP) .................................. 02405550

(51) Int. Cl.
*B05D 5/12* (2006.01)
*B05D 3/00* (2006.01)

(52) U.S. Cl. .............................. 427/407.1; 427/398.1; 427/411; 427/412; 427/412.5

(58) Field of Classification Search ................ 427/402, 427/407.1, 411, 412.1, 398.1, 420, 412, 412.5
See application file for complete search history.

(56) References Cited

U.S. PATENT DOCUMENTS

| | | |
|---|---|---|
| 4,877,686 A | 10/1989 | Riou et al. |
| 5,034,249 A | 7/1991 | Reif et al. |
| 6,620,508 B2 * | 9/2003 | Inoue et al. ................. 428/403 |
| 6,841,609 B2 * | 1/2005 | Chapman et al. ............ 524/493 |

FOREIGN PATENT DOCUMENTS

| | | | |
|---|---|---|---|
| EP | 0407720 A1 | | 1/1991 |
| EP | 0493100 A1 | | 7/1992 |
| EP | 0634286 A1 | | 1/1995 |
| EP | 0875394 A1 | | 11/1998 |
| EP | 0967086 A1 | | 12/1999 |
| EP | 1000767 A1 | | 5/2000 |
| EP | 1111452 A2 | | 6/2001 |
| EP | 1120281 A1 | | 8/2001 |
| EP | 1244114 A1 | | 9/2002 |
| EP | 1 120 281 A1 | * | 8/2005 |
| GB | 2132784 A | | 7/1984 |
| JP | 58-177390 A | * | 4/1982 |
| JP | 2001-096900 A | * | 9/1999 |

* cited by examiner

*Primary Examiner*—William Phillip Fletcher, III
(74) *Attorney, Agent, or Firm*—Onofrio Law; Dara L. Onofrio, Esq.

(57) ABSTRACT

A method for coating a moving web is described, wherein a coating solution containing one or more nanocrystalline, nanoporous inorganic compounds and one or more binders in an amount of 0.5% to 30% relative to the total weight of the nanocrystalline, nanoporous inorganic compounds is applied together with an auxiliary coating solution to the support, wherein this auxiliary coating solution contains at least one gelation-promoting ingredient that accelerates the gelation of the coating solution containing the nanocrystalline, nanoporous inorganic compounds.

8 Claims, No Drawings

METHOD FOR COATING A MOVING WEB AND ARTICLES MADE THEREBY

FIELD OF THE INVENTION

The invention relates to a method for coating a moving web for the preparation of printing or imaging media, including, for example, recording sheets for ink jet printing, and to the preparation of electrically active films. The invention also relates to electrically active films, imaging or printing media comprising a support, whereon one or more layers have been coated by the this method.

BACKGROUND OF THE INVENTION

In general, to form a coating on a flexible support, one or more coating solutions containing all the necessary ingredients are applied as a thin layer or layers to the moving web. The coated web is subsequently dried. A common way to dry such coated webs is to impinge hot air at high speed in an impingement dryer onto the surface of the coated web through a system of nozzles. In this process, however, the surface of the liquid layers, usually with high water content and low vicosity, tends to become uneven due to incessant pressure disturbances in the drier. For applications requiring good coating homogeneity, such as photographic materials or recording sheets for ink jet printing, the problem may be solved by using coating solutions that contain a thermo-reversible gelling binder such as gelatin. After applying the solution containing the thermo-reversible gelling binder to the web, the coated web is chilled to thicken or gel the applied solutions. The gelled layers are less prone to deformations of their surface due to the impingement of the air in the drier.

It is important that the rate of gelation upon chilling be fast, because otherwise the strength of the gelled binder would not be sufficiently high unless very long chilling times would be used. For a given coating installation, where the length of the chilling zone is fixed, longer chilling times can only be achieved by reducing the coating speed.

Only a few binders show thermo-reversible gelling behavior.

In the case where the coating solutions do not include a thermo-reversible gelling binder, chilling of the coated solutions does usually not improve the robustness of the coating surface against deformations due to the impingement of the air in the drying step.

It would therefore be desirable to provide a method that would allow the coating of solutions not containing a thermo-reversible gelling binder. These coating solutions would have a low viscosity during the coating process and then rapidly thicken or gel once applied to the moving web.

Such a method is to incorporate, using known methods, thickening agents to the coating solutions before their application to the moving web. This method, however, creates additional problems such as poor stability of the coating solutions, it requires the delivery fluids of high viscosity and it induces the formation of coating defects due to precipitation and slug formation. For coating solutions containing polyvinyl alcohol, such known thickening or gelation-promoting agents include boric acid and/or borates.

Patent application EP 634,286 discloses a coating fluid comprising an alumina sol and polyvinyl alcohol as a binder and having boric acid incorporated therein. By coating such a coating fluid onto a support, followed by drying, a recording sheet for ink jet printing may be obtained. This recording sheet has a porous ink-receiving layer consisting of a binder and nanoporous aluminium oxide/hydroxide capable of absorbing and fixing the different dyes in the recording liquids. The coating solution described in this patent application incorporates boric acid and/or borates to prevent cracking of the dried recording sheets for ink jet printing. In such a case, however, the gelation-promoting effect of boric acid and/or borates must be minimized in order to keep the viscosity of the coating fluid stable in time at a level compatible with used coating methods. This is usually achieved by dilution of the coating solution with a solvent, preferably water. The gelation-promoting effect of boric acid and/or borates in a coating liquid such as that described in patent application EP 634,286 is thus a drawback during the coating process. This effect would, however, be highly desirable on the coated moving web in order to accelerate the gelation of the applied coating solution and thus eliminate or reduce the number of coating defects.

Patent application GB 2,132,784 describes the use of an overcoat comprising a mixture of polyvinyl alcohol and boric acid together with an inorganic pigment. The application does not disclose a method for controlling the gelation of the coating solution by removing the boric acid from the coating solution containing the polyvinyl alcohol.

U.S. Pat. No. 4,877,686 describes the preparation of recording sheets for ink jet printing, wherein the ink-receiving layer contains polyvinyl alcohol as a binder, boric acid and a filler having a high absorption capacity, and where the ratio of binder to filler is from 10% to 100% by weight relative to the amount of filler.

U.S. Pat. No. 5,034,249 describes the preparation of photographic materials, wherein the coating solution contains an instant hardener, but practically no binder, and where the gelatin containing layers below this coating layer are cross-linked by the instant hardener.

Patent application EP 1,111,452 describes a method for coating a moving web, wherein the web, optionally pre-coated with one or more layers, is coated in a first step with a coating solution containing a viscosity-increasing ingredient. This coated layer is then dried and subsequently overcoated in a second step with a second coating solution comprising a film-forming polymer to form an image-receiving layer. In a preferred embodiment of the invention for the preparation of recording sheets for ink jet printing, the viscosity-increasing ingredient is a borate and the film-forming binder in the ink-receiving layer is polyvinyl alcohol. It is claimed that a substantial amount of the viscosity-increasing ingredient deposited in the first step solubilizes in the second coating step and diffuses into the ink-receiving layer, where it interacts with the film-forming binder and increases the viscosity of the second coating solution applied to the web in a controlled way. Coating and drying of the first layer containing the viscosity-increasing ingredient is, however, expensive, and it would be highly desirable if this first step could be avoided.

Thus there is a need for an improved coating method without a second coating step, wherein coating defects could be eliminated or their number reduced.

SUMMARY OF THE INVENTION

In general the invention is directed to recording sheets for ink jet printing and to electrically active films both having incorporated nanoporous compounds.

More particularly the invention provides a method of coating a substrate by promoting gelation of coating solutions immediately after their application to a moving web. This is accomplished by application of a main coating solution containing a binder and at least one nanoporous compound and a separate auxiliary coating solution containing a gelation promoting ingredient. The auxiliary coating solution may be positioned above or below the main coating solution. Application of the main coating solution and auxiliary coating solution to the substrate may be simultaneous or may be applied separately as two distinct layers to the moving web.

Gelation refers to the transition from a liquid state of relatively low viscosity (typically below 200 mPasec) to a state characterized by viscoplastic rheological behavior with a viscosity above 1000 mPasec. As such the term gelation means the same as viscosity increasing and is referred to herein interchangeably.

The viscosity of the coating solutions used in the invention are mainly controlled by their degree of dilution. The viscosities may be increased by a reduction of the coating temperature and reduced by an increase of coating temperature. The viscosities of the different coating solutions used in the invention are chosen in a way that the coating defects disappear.

Advantage of the invention coating process is in the ability to coat at high speeds with coating solutions at relatively low viscosities which are then thickened on the support.

Other objects, features, and advantages of the present invention will become apparent from the following detailed description of the invention.

DETAILED DESCRIPTION OF THE INVENTION

As mentioned before, the drying technology used on many coating machines is based on the impingement of hot air of high speed, through a system of nozzles, onto the surface of a coated support. During the drying process, the coating solutions applied to the support show a tendency to form an uneven surface. Liquid layers of very low viscosity may even be blown off the support by the impinging air. A possibility to alleviate this problem is to promote the gelation of the coating solutions immediately after their application to the moving web. By "gelation" is meant the transition from a liquid state of relatively low viscosity (typically below 200 mPasec) to a state characterized by viscoplastic rheological behavior with a viscosity above 1000 mPasec at low shear rates.

The invention allows the coating of moving webs with a low level of coating defects, in particular at high coating speeds. A "viscosity-increasing" or "gelation-promoting" ingredient is selected which has the property to interact with at least one other compound contained in the coating solution to increase the viscosity or to gel or cross-link the solution. The words "viscosity-increasing ingredient" or "gelation-promoting ingredient" may refer to a compound that is capable of increasing the viscosity of a binder-containing solution through interaction with the binder. In the case of a solution containing a concentrated colloidal dispersion of inorganic pigments, a gelation-promoting ingredient may refer to a compound that is capable of increasing the viscosity of the solution by destroying the colloidal stability of the solution.

The viscosity-increasing or gelation-promoting ingredient is contained in an auxiliary coating solution, which is applied to the moving web together with at least one main coating solution. This second, main coating solution contains all the necessary ingredients for final product performance.

The auxiliary layer containing the gelation-promoting ingredient may contain other compounds, such as surfactants, necessary for adjusting the properties of the final product, provided that an eventual interaction between other components and the viscosity-increasing or gelation-promoting ingredient does not lead to an unstable viscosity behavior of the auxiliary coating solution. Additives without a gelation-promoting effect may also be removed from the main coating solution and be incorporated into the auxiliary coating solution.

An advantage of this coating process is the ability to coat at high speed, since the coating solutions can be applied to the moving web at the relatively low viscosities required in high speed coating processes and then thickened on the support quickly enough so that the surface of the layers is no longer disturbed by the impingement, through nozzles, of hot air.

A further advantage is the possibility to incorporate gelatin-promoting or cross-linking ingredients without deterioration of the viscosity behavior of the coating solutions.

The preferred value for the viscosity of the coating solutions depends on the coating method used. For known multi-layer coating applicators, such as slot die hopper, suction slide hopper (cascade hopper), curtain coating hopper, extrusion/slide hopper, and the like, the preferred viscosity values for the coating solutions are between 1 and 200 mPasec at the coating temperature.

A preferred embodiment of the invention relates to a method for applying solutions containing one or more nanocrystalline, nanoporous inorganic compounds and one or more binders onto a moving web, which form each, after drying, a thin layer containing the nanocrystalline, nanoporous inorganic compounds and the binders in a amount from 2% to 30% by weight of the nanocrystalline, nanoporous inorganic compounds. Such nanocrystalline, nanoporous inorganic compounds containing layers, preferably transparent, find their applications for example as electrically active films in various products including batteries, solar cells, electrochromic glasses or in recording sheets for ink jet printing.

Typical nanocrystalline, nanoporous inorganic compounds are nanoporous metal oxides of aluminium or silicium or oxide/hydroxides of aluminium, or oxides or chalcogenides of the transition metals or their Li inclusion complexes.

In the preparation of ink-receiving layers for recording sheets for ink jet printing or of electrically active layers for electrically active films containing nanocrystalline, nanoporous inorganic compounds, the main coating solution contains at least one colloidal dispersion of these nanocrystalline, nanoporous inorganic compounds and one or more film-forming binders in an amount preferably not exceeding 30% by weight of the nanocrystalline, nanoporous inorganic compounds.

After applying the main coating solution, together with the auxiliary coating solution, and, optionally, other auxiliary layers, the viscosity-increasing or gelation-promoting ingredient diffuses from the auxiliary coating solution into the main coating solution and interacts with at least one of its components, which causes the viscosity of the main coating solution to increase considerably. The increase in viscosity may be controlled, for example, by adding auxiliary coating addenda such as low molecular weight diluents (for example water), or by adjusting the value of pH or the ionic strength of the auxiliary coating solution. The main coating solution may be gelled or cross-linked in this way.

The auxiliary coating solution may be positioned above or below the main coating solution (or main coating solutions). In a preferred embodiment, the auxiliary layer is positioned as the uppermost layer of the system.

In a further embodiment of the invention, the gelation-promoting ingredient is not present during the preparation of the coating solutions containing the binders and the nanocrystalline, nanoporous inorganic compounds and is not added to them immediately before the coating process starts, for example by injection into the coating solution. It is instead added to the multilayer assembly by incorporating it into the auxiliary coating solution. The main coating solutions containing the binders and the nanocrystalline, nanoporous inorganic compounds are applied together with the auxiliary coating solution as two distinct layers to the moving web. The applied layers are optionally chilled and subsequently dried by impingement of hot air through a system of nozzles.

In another embodiment of the invention, the auxiliary coating solution may substantially have a similar composition as the main coating solution—except for the amount of the gelation-promoting ingredient—provided that the concentration of the auxiliary coating solution is lowered to assure that its viscosity behavior is acceptable. Typically, the content of solids in such an auxiliary coating solution is not higher than 60% of the content of solids in the main coating solution.

In yet another embodiment of the invention, the viscosity change in the main coating solution containing one or more colloidal materials may be caused by a loss of colloidal stability triggered by a change of the value of pH or ionic strength, i.e. by diffusion of an acid or base, or of ionic species, from the auxiliary coating solution into the main coating solution to be gelled.

The film-forming binders used in recording sheets for ink jet printing and in electrically active films include for example polyurethanes, polyvinyl alcohol, acryl polymers, polyolefins, polyesters, polyamides, polycarbonates, polyethers, polyureas, and mixtures thereof. In general, these film-forming polymers do not show thermo-reversible gelling behavior. The binders need to have reactive functional groups in order to be thickened by the gelation-promoting ingredient. A preferred binder is polyvinyl alcohol.

In a preferred embodiment of the invention, the gelation-promoting ingredient is a borate such as sodium tetraborate decahydrate or sodium borate, boric acid, derivatives of boric acid, boric anhydride and the like, used in combination with polyvinyl alcohol as the binder in the main coating solution. Other cross-linking or gelling/thickening agents may be used in order to further increase the viscosity of the solution containing the film-forming binder. Their effectiveness depends on the specific application and the type of the binder that needs to be cross-linked. Cross-linking agents that could be used include aldehydes, dialdehydes, dihydroxy dioxane, glyoxal, glutaraldehyde, methylolmelamine, bifunctional or polyfunctional isocyanates, bifunctional or polyfunctional aziridines and epoxides, vinyl sulfones and triazines.

Preferred nanocrystalline, nanoporous inorganic compounds for the preparation of recording sheets for ink jet printing are nanocrystalline, nanoporous oxides of aluminium or silicium or oxide/hydroxides of aluminium, mica or montmorillonite.

Particularly preferred nanocrystalline, nanoporous oxides are colloidal silicium dioxide or colloidal aluminium oxide, a particularly preferred oxide/hydroxide is colloidal aluminium oxide/hydroxide.

The most preferred nanocrystalline, nanoporous oxides or oxide/hydroxides are pseudo-boehmite, colloidal γ-$Al_2O_3$ or pseudo-boehmite comprising one or more of the elements of the rare earth series of the periodic system of the elements with atomic numbers 57 to 71 in an amount of from 0.4 to 2.5 mole percent relative to $Al_2O_3$, as described in patent applications EP 0,407,720, EP 0,875,394 and EP 1,162,076.

In the case where colloidal silicium oxide is used as nanocrystalline, nanoporous oxide, it is preferentially positively charged.

Typically, the thickness of such layers in the dry state ranges is between 2 μm and 100 μm. This means that quantities between 40 g/m² and 300 g/m² of the coating solution have to be applied to the web. In some cases, the susceptibility of the coated layers against deformations due to the impingement of the hot air in the drying step may be lowered if the coated support is chilled to a temperature below 10° C. before drying, even if no binders showing thermo-reversible behavior are used.

In recording sheets for ink jet printing, the auxiliary layer may be incorporated into any suitable layer assembly wherein the ink absorbing system comprises at least one ink-receiving layer containing one or more binders and nanocrystalline, nanoporous metal oxides or oxide/hydroxides, as described for example in patent application EP 1,000,767.

In electrically active films, the auxiliary layer may be incorporated into any suitable layer assembly where the system comprises at least one electrically active layer containing one or more binders and nanocrystalline, nanoporous transition metal oxides, chalcogenides or their Li inclusion complexes, as described for example in patent application EP 1,244,114.

Different supports may be used in the preparation of recording sheets for ink jet printing or of electrically active films including, for example, plain or calendered paper, polyolefin coated papers, polymeric films such as poly(ethylene terephthalate), poly(ethylene naphthalate), polyvinyl chloride, polyimide, polycarbonate or cellulose esters.

Polyolfin coated papers and poly(ethylene terephthalate) are preferred supports or recording sheets for ink jet printing. Poly(ethylene terephthalate), poly(ethylene naphthalate), polyvinyl chloride, polyimide and polycarbonate are preferred supports for electrically active films.

The thickness of these supports may vary from about 50 μm to 500 μm, preferably from about 75 μm to 300 μm. The supports may optionally contain antioxidants, antistatic agents, plasticizers, dyes, pigments and other compounds known to someone skilled in the art.

Fibrous textile materials may also be used as supports.

In order to improve the adhesion of the ink-receiving layer or the electrically active layer to the support, the surface of the support may be coated with adhesion-promoting agents or subjected to corona-discharge treatment prior to the coating process.

In the case of a support used to prepare recording sheets for ink jet printing, the support typically comprises on at least one of its surfaces an ink-receiving layer. Recording sheets intended for viewing by reflected light have an opaque support and those intended for viewing by transmitted light have a transparent support.

Optionally a backing layer may be applied to the backside of the support in order to improve for example their machine-handling properties, the curl and the frictional properties of the recording sheets.

Typically, the backing layer may comprise a binder and a filler. Typical fillers include amorphous and crystalline silicium dioxide, poly(methyl methacrylate), polystyrene beads, microcrystalline cellulose, zinc oxide, talc, barium sulfate, titanium dioxide and the like. The amount of filler is generally lower than 10% by weight of the amount of binder. The size of the filler particles is from 5 µm to 30 µm. Typical binders used in the backing layers are polymers such as acrylates, gelatin, methacrylates, polystyrenes, acrylamides, polyvinyl alcohol, cellulose derivatives and the like. An antistatic agent may optionally be included in the backing layer in order to prevent electrostatic charging of the recording sheets. An ink-receiving layer may also be coated on the backside, if desired.

Preferably, one or more ink-receiving layers capable of absorbing the solvent contained in the inks are coated onto the support. The thickness of such a layer is typically from 10 µm to 50 µm. The ink-receiving layer contains a hydrophilic binder, for example naturally occurring hydrophilic colloids such as gelatin, albumin, guar, xanthan, chitosan, starch and its derivatives, functionalized resins and modified starch, cellulose ethers and their derivatives, polyvinyloxazoline and polyvinylmethyloxazoline, polyoxides, polyethers, poly(ethylene imines), polyvinyl alcohol, derivatives of polyvinyl alcohol, copolymers and mixtures of these compounds. Polyvinyl alcohol and its derivatives are the preferred hydrophilic absorbing binders in ink-receiving layers.

Ink-receiving layers may also contain other additives, including matting agents in order to improve the frictional properties and abrasion resistance of the recording sheets; surfactants for enhancing the uniformity of the ink-receiving layer and adjusting the surface tension of the dried material; fluorescent dyes; pH controllers; anti-foaming agents; lubricants; preservatives; dye-fixing agents; viscosity modifying agents; waterproofing agents; dispersing agents; UV absorbing agents; mordants and the like.

A recording sheet for ink jet printing may further be overcoated with an ink-permeable, ink-receptive anti-tack coating consisting of hydrophilic cellulose derivatives such as methyl cellulose, ethyl cellulose, hydroxyethyl cellulose, hydroxypropyl cellulose, sodium carboxymethyl cellulose and sodium carboxyethyl cellulose.

Preferred nanocrystalline, nanoporous inorganic compounds for the preparation of electrically active films are nanocrystalline, nanoporous transition metal oxides, chalcogenides or their Li inclusion complexes. Especially preferred are $TiO_2$, $Ti_2O_3$, $Nb_2O_5$, $WO_3$, $V_2O_5$, $MoO_3$, $MnO_2$, $HfO_2$, $TiS_2$, $WS_2$, $TiSe_2$, $Fe_2O_3$, $Fe_3O_4$, $RuO_2$, $RuS_2$, $MoS_2$, $WS_2$, $IrO_2$, $CeO_2$, $InO_2$, $TaO_2$, $ZnO$, $SnO_2$, $BaTiO_3$, $SrTiO_3$ or indium-tin-oxide with specific surfaces between 10 $m^2/g$ und 400 $m^2/g$. Lithium inclusion complexes such as $LiMn_2O_4$, $LiNiO_2$, $LiCoO_2$ or $Li(NiCo)O_2$ may also be used as described in patent application EP 1,244,114.

The electrically active films contain these nanocrystalline, nanoporous transition metal oxides, chalcogenides or Lithium inclusion complexes in an amount of from 1 $g/m^2$ to 100 $g/m^2$, preferably in an amount of from 3 $g/m^2$ to 50 $g/m^2$. These quantities correspond to dry film thicknesses between 1 µm and 100 µm, respectively 3 µm and 50 µm.

The quantity of the film-forming binder should be as low as possible, but nevertheless sufficiently high in order to get good adhesion between the electrically active layer and the support. Suitable quantities are from 0.5% to 20% by weight of the film-forming binder relative to the total quantity of the nanocrystalline, nanoporous transition metal oxides, chalcogenides or their Li inclusion complexes.

Preferred are electrically active films having coated onto a support at least one electrically active layer, and, on top of it, an electrically inactive layer. Preferably the electrically inactive layer contains a film-forming binder and an electrically inactive pigment.

Especially preferred are electrically active films, where the electrically inactive layer consists of $\gamma$-$Al_2O_3$ as pigment and polyvinyl alcohol as binder, wherein the ratio between binder and pigment is from 1:5 to 1:40, in particular from 1:10 to 1:30 and the thickness is from 2 µm to 20 µm, in particular from 4 µm to 15 µm.

The invention provides a method of preparing, coating and drying of solutions containing nanocrystalline, nanoporous inorganic compounds, wherein the gelation-promoting effect of some additives is used to promote the gelation of the liquid layers immediately after applying them to the support, without the need of an additional coating pass and without the problems of viscosity instability usually associated with the use of gelation-promoting ingredients.

An advantage of the method according to the invention is that it is possible to use big amounts of the gelation-promoting ingredient or ingredients in the auxiliary coating solution. The viscosity of the main coating solution will be stable even if the properties of the final product require large amounts of gelation-promoting ingredients. In addition, the concentration of the nanocrystalline, nanoporous inorganic compounds in the main coating solution may be increased without loss of viscosity stability. This results in a lower drier load or a higher coating speed for a given drying capacity.

An unexpected advantage of the present invention is that the rate of gelation of the applied layers upon chilling is increased when the gelation-promoting ingredient is removed from the main coating solution and incorporated into the auxiliary coating solution. This can be explained as follows: Additives—with or without a gelation-promoting effect—need to be added to the coating solutions containing the nanocrystalline, nanoporous inorganic compounds normally as diluted, mostly aqueous solutions due to their normally limited solubility. Removal of these additives from the main coating solution is therefore an effective way to increase the concentration of the main coating solution containing the nanocrystalline, nanoporous inorganic compounds. This higher concentration drastically increases the rate of gelation of the coating solutions containing the nanocrystalline, nanoporous inorganic compounds upon chilling.

Unexpectedly, it has also been found that the disturbances imparted to the surface of the auxiliary layer, when it is in the uppermost position, by hot air impinging the film in the drier are negligible and without adverse effect to final product performance even if the auxiliary layer is of low viscosity and has no tendency to gel on its own upon chilling. This is the case when the auxiliary coating solution is applied in a quantity below 25 $g/m^2$, preferably below 20 $g/m^2$.

Thus, the invention provides a method for coating a moving web, wherein the coated support has a very homogeneous surface with a low level of coating defects even when coated at high speed and dried by impinging hot air.

This coating process can be practiced on conventional available apparatus used in the coating and drying industry, for example in the case of preparation of recording sheets for ink jet printing or of electrically active films. A web coating apparatus conveys a web over rollers and around a coating roll, which supports the web for the application of coating solutions via an appropriate applicator. Application can be made by various known multi-layer coating methods such as cascade coating, curtain coating, extrusion coating, and the like. After application of the liquid coating solutions, the web passes through a series of drying zones in order to remove the solvent from the layers.

The present invention will now be described in detail with reference to the following examples. However, it has to be understood that the present invention will not be restricted or limited in any way by these specific examples.

EXAMPLES

Example 1

A first main coating solution for the preparation of an ink-receiving layer for recording sheets for ink jet printing containing the ingredients of Table 1 was prepared. The quantities, with the exception of water, are those of the coated and dried ink-receiving layer.

TABLE 1

| Component (Concentration) | Quantity (g/m$^2$) |
|---|---|
| Lanthanum-doped AlOOH (solid powder) | 48.000 |
| Lactic acid (90%) | 0.780 |
| Polyvinyl alcohol A (10.0%) | 1.440 |
| Polyvinyl alcohol B (7.5%) | 2.880 |
| Plasticizer 1 (40%) | 1.440 |
| Plasticizer 2 (50%) | 0.200 |
| Surfactant (3%) | 0.208 |
| Water | 153.752 |
| Total | 208.700 |

The Lanthanum-doped AlOOH was prepared according to the method described in patent application EP 0,967,086, example 1. Polyvinyl alcohol A is Mowiol 26–88, polyvinyl alcohol B is Mowiol 56–98, both available from Omya AG, Oftringen, Switzerland; plasticizer 1 is 1,1,1-tris-(hydroxymethyl)-propane, available from Fluka-Chemie, Buchs Switzerland; plasticizer 2 is glycerol; the surfactant is Triton X-100, available from Christ Chemie AG, Reinach, Switzerland.

A second coating solution for the auxiliary layer containing the ingredients of Table 2 was prepared. The quantities, with the exception of water, are those of the coated and dried auxiliary layer.

TABLE 2

| Component (Concentration) | Quantity (g/m$^2$) |
|---|---|
| Lanthanum-doped AlOOH (solid powder) | 2.000 |
| Lactic Acid (90%) | 0.032 |
| Polyvinyl alcohol A (10.0%) | 0.060 |
| Polyvinyl alcohol B (7.5%) | 0.120 |
| Plasticizer 1 (40%) | 0.060 |
| Plasticizer 2 (50%) | 0.010 |
| Surfactant (3%) | 0.020 |
| Boric acid (5%) | 0.600 |
| Water | 18.098 |
| Total | 21.000 |

Boric acid is available from Schweizerhall Chemie, Schweizerhalle, Switzerland.

A curtain-coating device was used to apply these two solutions to a transparent polyester support. Both layers were coated simultaneously using the multilayer curtain-coating technique, the auxiliary solution being coated as the uppermost layer. 208.7 g/m$^2$ of the main coating solution of Table 1 were applied together with 21.0 g/m$^2$ of the auxiliary coating solution of Table 2 to the support. Immediately after coating, the coated support was kept for a pre-set period of time in a chilling zone maintained at a temperature of 10° C. and was subsequently dried by direct impingement of hot air onto the coated support at a speed of about 37 m/sec through an array of nozzles. The residence time in the chilling zone (between coating and drying) was set to 20 seconds. The strength of the gelled layers after chilling was evaluated by visual observation of the dried film, where a defect well known in the art as drier bands could be seen. This defect—which appears as longitudinal (downweb) bands with a density or a haze contrast—results from local deformations of the coated layers upon the impact of the hot impinging air in the drier.

A five-grade scale was used to evaluate the results:

| | |
|---|---|
| 1 (best): | drier bands not visible at all |
| 2: | drier bands slightly visible |
| 3: | drier bands clearly visible |
| 4: | visible cross-web deformations of the coating in addition to sharp drier bands |
| 5 (worst): | coating blown off the substrate. |

The quality of the coated layers obtained with the two-layer formulation described in example 1 was acceptable and rated as 2 (drier bands slightly visible). No viscosity increase of the coating solutions was observed.

Example 2

A main coating solution for the preparation of another ink-receiving layer containing the ingredients of Table 3 was prepared. The quantities, with the exception of water, are those of the coated and dried ink-receiving layer.

TABLE 3

| Component (Concentration) | Quantity (g/m$^2$) |
|---|---|
| Lanthanum-doped AlOOH (solid powder) | 45.000 |
| Lactic Acid (90%) | 0.732 |
| Polyvinyl alcohol A (10.0%) | 1.350 |
| Polyvinyl alcohol B (7.5%) | 2.700 |
| Plasticizer 1 (40%) | 1.015 |
| Plasticizer 2 (50%) | 0.335 |
| Surfactant (3%) | 0.120 |
| Water | 148.748 |
| Total | 200.000 |

A coating solution for an auxiliary layer containing the ingredients of Table 4 was prepared. The quantities, with the exception of water, are those of the coated and dried auxiliary layer.

TABLE 4

| Component (Concentration) | Quantity (g/m$^2$) |
|---|---|
| Plasticizer 2 (50%) | 0.335 |
| Surfactant (3%) | 0.011 |
| Boric acid (5%) | 0.540 |
| Water | 17.114 |
| Total | 18.000 |

The two layers were curtain-coated in a single pass as in Example 1, but with a residence time in the chilling zone of 2 minutes.

The quality of the coated layers was rated as 2. The physical and the imaging properties of the recording sheets for ink jet printing were the same as those of recording sheets prepared with a single solution including the gelation-promoting ingredient boric acid.

Comparative Example 1

The two-layer system of Example 1 was coated under the same conditions as in example 1, except that the amount of boric acid in the auxiliary layer was reduced from 600 mg/m$^2$ to 150 mg/m$^2$.

The quality of the coated layers was poor and rated as 4. In addition, the surface had considerably more cracks in comparison to example 1.

This result shows that the boric acid contained in the auxiliary coating solution of Example 1 not only promotes the gelation of the main coating solution, but also suppresses the formation of cracks in the dried recording sheets.

Comparative Example 2 (Prior art)

The main coating solution of Example 1 was reformulated by adding 550 mg/m$^2$ of boric acid to it. This solution was then curtain-coated onto the support as a single layer under the same conditions.

The quality of the coated layer was poor and rated as 3. In comparison to example 1, drier bands were more visible. Therefore the gelled layer was considerably less stable after chilling to the disturbances induced by the impingement of hot air.

In addition, the viscosity of the coating solution increased drastically with time due to the relatively large amount of boric acid incorporated therein. The poor stability of the coating solution resulted in the formation of aggregates that produced further coating defects on the coated support after coating.

Comparative Example 3 (Prior art)

The two coating solutions of Example 2 were mixed and 229.7 g/m$^2$ (sum of the quantities of the two solutions of Example 2) of the mixed solution were applied to the support.

The quality of the coated layers was rated as 3 after a chilling time of 2 minutes. The quality could be improved by increasing the chilling time, but the quality was systematically one grade lower in comparison to example 2 under identical chilling and drying conditions.

This result shows that the gelation-promoting effect of the boric acid is considerably more effective in the present invention than in the prior art.

Finally, variations from the examples given herein are possible in view of the above disclosure. Therefore, although the invention has been described with reference to certain preferred embodiments, it will be appreciated that other coating solutions may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. A method for coating a moving web with a coating solution containing: one or more nanocrystalline, nanoporous inorganic compounds selected from the group consisting of transition metal oxides, transition metal chalcogenides, and their Li inclusion complexes, wherein the nanocrystalline, nanoporous inorganic compound is $TiO_2$, $Ti_2O_3$, $Nb_2O_5$, $WO_3$, $HfO_2$, $TiS_2$, $WS_2$, $TiSe_2$, $Fe_2O_3$, $Fe_3O_4$, $RuO_2$, $RuS_2$, $MoS_2$, $WS_2$, $IrO_2$, $CeO_2$, $InO_2$, $TaO_2$, $ZnO$, $SnO_2$, $BaTiO_3$, $SrTiO_3$, indium-tin-oxide, $LiMn_2O_4$, $LiNiO_2$, $LiCoO_2$, or $Li(NiCo)O_2$; and one or more binders in an amount from 0.5% to 30% by weight of the nanocrystalline, nanoporous inorganic compounds,
wherein an auxiliary coating solution is applied together with said coating solution to the web,
wherein said auxiliary coating solution contains at least one gelation-promoting ingredient which promotes gelation of the coating solution containing the nanocrystalline, nanoporous inorganic compounds, and
wherein the coating solution containing the nanocrystalline, nanoporous inorganic compounds forms the electrically conductive layer of an electrically active film.

2. A method according to claim 1, wherein the coating solution containing the nanocrystalline, nanoporous inorganic compounds and the auxiliary coating solution are applied simultaneously to the web according to the multilayer slide-coating or curtain-coating technique.

3. A method according to claim 1, wherein the auxiliary coating solution is the uppermost layer of a multilayer assembly which includes the layer containing the nanocrystalline, nanoporous inorganic compounds.

4. A method according to claim 1, wherein the binders do not have a thermo-reversible gelling behavior.

5. A method according to claim 1, wherein the gelation-promoting ingredient is a cross-linking agent, boric acid or a borate.

6. A method according to claim 1, wherein the coated web is chilled to a temperature of 10° C. or less immediately after coating and before drying.

7. A method according to claim 1, wherein the web is selected from the group consisting of coated or uncoated paper, transparent or opaque polyester film and fibrous textile materials.

8. A method according to claim 1, wherein the nanocrystalline, nanoporous inorganic compounds have specific surface areas between 10 mg$^2$/g and 400 m$^2$/g.

* * * * *

UNITED STATES PATENT AND TRADEMARK OFFICE
CERTIFICATE OF CORRECTION

PATENT NO.       : 7,172,793 B2  
APPLICATION NO.  : 10/611752  
DATED            : February 6, 2007  
INVENTOR(S)      : Cohu It is certified that error appears in the above-identified patent and that said Letters Patent is hereby corrected as shown below:

On the Title Page under (56) References Cited

U.S. PATENT DOCUMENTS

First line: delete "4,877,686" and replace with -- 4,877,868 --.

Under the Claims

Col. 12 line 16 after "$WO_3$" insert -- $V_2O_5$, $MoO_3$, $MnO_2$ --.

Signed and Sealed this

Fifteenth Day of May, 2007

JON W. DUDAS  
*Director of the United States Patent and Trademark Office*